UNITED STATES PATENT OFFICE.

BENJAMIN H. LIGHTFOOT, OF PHILADELPHIA, PENNSYLVANIA.

IMPROVEMENT IN TREATING TANNED LEATHER.

Specification forming part of Letters Patent No. 43,120, dated June 14, 1864; reissue No. 5,016, dated July 30, 1872; reissue No. 5,652, dated November 11, 1873; application filed October 18, 1873.

*To all whom it may concern:*

Be it known that I, BENJAMIN H. LIGHTFOOT, of Philadelphia, county of Philadelphia, State of Pennsylvania, have invented an Improved Mode of Treating Tanned Leather, of which the following is a specification:

Before describing my present invention it will be necessary to allude to my patent of the 17th of November, 1863, in which I claimed "the treatment of tanned leather by the application to the same of petroleum or any oily hydrocarbon holding paraffine in solution, in combination with tallow, or its equivalent."

In carrying out my said patented invention I discovered that crude petroleum alone, or any of the mineral oils of sufficient body and gravity, might be applied with good effect to the currying or dressing of many kinds of leather without the intervention of tallow, or its equivalent, the mineral oils under 35° Baumé being those which in practice I have found best adapted to the purpose.

These oils may be applied to calf-skins, or sheep or goat skins, or all kinds of morocco, by rubbing the oil into the same, the currying or dressing of these skins being thereby accomplished in the most satisfactory manner, and in a very short space of time. This treatment is also well adapted to the currying or dressing of sole-leather, pebble-grain, and other leathers.

The oils to be used may be crude petroleum or any of the mineral oils having sufficient body and gravity, and preferably purified and deodorized by any of the well-known processes.

In some instances it is desirable to mix these mineral oils with ordinary fish or streights oil, in proportions of about one-half of each.

It will be evident that such oils, or mixture of oils, may be advantageously used for oiling harness or other articles of leather for the purpose of maintaining them in proper pliable condition.

I claim as my invention—

1. The currying or dressing of tanned leather, by applying to the same petroleum or any mineral oils of sufficient body and gravity, with or without an admixture of fresh or streights oil, substantially as herein described.

2. As a new article of manufacture, leather dressed or curried by the application of petroleum or any mineral oil of sufficient body or gravity, alone or mixed with other substances, as set forth.

3. A mixture for dressing tanned leather, &c., consisting of petroleum or any mineral oil of sufficient body and gravity, and fish-oil, or its equivalent.

In testimony whereof I have signed my name to this specification in the presence of two subscribing witnesses.

BENJAMIN H. LIGHTFOOT.

Witnesses:
J. S. SINGER,
HARRY SMITH.